US010953836B2

(12) United States Patent
Wold et al.

(10) Patent No.: US 10,953,836 B2
(45) Date of Patent: Mar. 23, 2021

(54) SURROUNDING AIRBAG ASSEMBLIES AND METHODS OF DEPLOYMENT

(71) Applicant: Autoliv ASP, Inc., Ogden, UT (US)

(72) Inventors: Dana Joseph Wold, Farmington Hills, MI (US); Changsoo Choi, Rochester, MI (US); Mohamad Youssef Alsedawi, Dearborn Heights, MI (US); Frank Joseph Herzenstiel, II, Davisburg, MI (US)

(73) Assignee: Autoliv ASP, Inc., Ogden, UT (US)

( * ) Notice: Subject to any disclaimer, the term of this patent is extended or adjusted under 35 U.S.C. 154(b) by 45 days.

(21) Appl. No.: 16/509,338

(22) Filed: Jul. 11, 2019

(65) Prior Publication Data

US 2021/0009074 A1 Jan. 14, 2021

(51) Int. Cl.
*B60R 21/231* (2011.01)
*B60R 21/207* (2006.01)
*B60R 21/2342* (2011.01)

(52) U.S. Cl.
CPC ...... *B60R 21/23138* (2013.01); *B60R 21/207* (2013.01); *B60R 21/2342* (2013.01); *B60R 2021/23107* (2013.01); *B60R 2021/23146* (2013.01)

(58) Field of Classification Search
CPC ............ B60R 21/23138; B60R 21/207; B60R 21/201; B60R 21/2342; B60R 2021/23107; B60R 2021/23146; B60R 2021/0006
See application file for complete search history.

(56) References Cited

U.S. PATENT DOCUMENTS

| 9,981,624 B2* | 5/2018 | Perlo ..................... B60R 21/207 |
| 10,730,470 B2* | 8/2020 | Choi ..................... B60R 21/214 |
| 2018/0222432 A1 | 8/2018 | Schneider | |
| 2019/0283700 A1* | 9/2019 | Kwon ............... B60R 21/23138 |
| 2019/0299910 A1* | 10/2019 | Kanegae ........... B60R 21/23138 |

(Continued)

FOREIGN PATENT DOCUMENTS

| DE | 19859988 A1 | 6/2000 |
| EP | 3098116 | 11/2016 |

(Continued)

OTHER PUBLICATIONS

International Search Report and Written Opinion dated Aug. 31, 2020 for international application PCT/US2020/033787.

*Primary Examiner* — Faye M Fleming
(74) *Attorney, Agent, or Firm* — Stoel Rives LLP; R. Whitney Johnson

(57) ABSTRACT

A surrounding inflatable airbag assembly configured to deploy for a seat back of a vehicle is disclosed. Inflatable airbag assemblies may provide protection for an occupant in a vehicle collision event. In a collision event, or other event producing forward and/or lateral movement of the occupant relative to the vehicle, the disclosed inflatable airbag assembly may receive and support the occupant during ride down so as to prevent or minimize injury resulting from impact with a vehicle structure disposed forward or lateral to a vehicle seating position. The disclosed airbag may deploy from the seat back including a head back portion. During deployment, a front portion of the airbag may extend up and over the head of the occupant and further extend forward and downward in front of the vehicle seating position.

18 Claims, 10 Drawing Sheets

(56) References Cited

U.S. PATENT DOCUMENTS

2019/0389420 A1* 12/2019 Dry .................. B60R 21/231
2020/0114858 A1*  4/2020 Henriksson .......... B60R 21/235
2020/0307488 A1* 10/2020 Kondrad ............. B60R 21/215
2020/0307489 A1* 10/2020 Line ................ B60R 21/23184
2020/0317154 A1* 10/2020 Choi ................ B60R 21/2338

FOREIGN PATENT DOCUMENTS

EP          3437938        2/2019
JP      2019218014 A   * 12/2019  .......... B60R 21/231

* cited by examiner

SURROUNDING AIRBAG ASSEMBLIES AND METHODS OF DEPLOYMENT

TECHNICAL FIELD

The present disclosure relates generally to the field of automotive protective systems. More specifically, the present disclosure relates to airbag systems that are configured to deploy in collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

Figure 1:
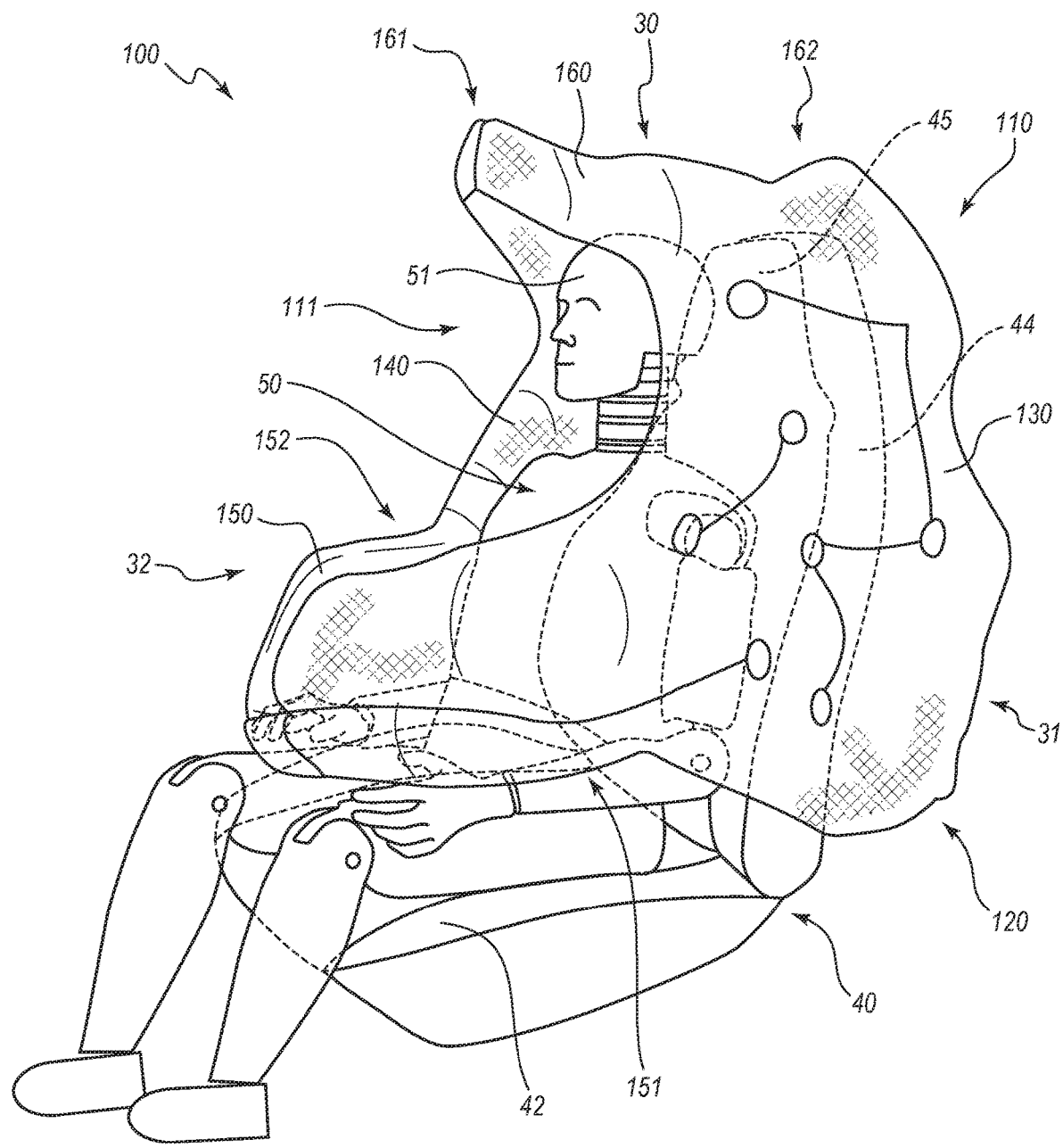
FIG. 1 is an isometric side view of an inflatable airbag assembly in a deployed state disposed about an occupant in a vehicle seating position of a vehicle, according to an embodiment of the present disclosure.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag assemblies are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. The present disclosure may afford frontal and lateral protection to an occupant. In the following disclosure, "airbag" generally refers to a single inflatable airbag that deploys from a seat back providing lateral and frontal protection during a collision event.

During installation, airbags are typically disposed in a packaged state (e.g., are rolled, folded, and/or otherwise compressed) and may be retained in the packaged state behind portions of an interior of a vehicle defining a cover. In some scenarios, an airbag may be disposed in the packaged state at a location away from a desired location after deployment requiring displacement of the airbag in one or more directions during deployment. During a collision event, an inflator is triggered, which rapidly fills the airbag with inflation gas. The airbag can rapidly transition from the packaged state to a deployed state or an expanded configuration. For example, the expanding airbag can open an airbag cover (e.g., by tearing through a burst seam or opening a door-like structure) to exit the cover. The inflator may be triggered by any suitable device or system, and the triggering may be in response to and/or influenced by one or more vehicle sensors during a collision event.

Some embodiments of the airbag assembly disclosed herein may be more suitable to cushion a front-seat passenger, while other embodiments may be more particularly suitable for a passenger of a seat other than the front seat, such as a more rearward seat. An airbag assembly can mitigate injury to an occupant of a vehicle during a collision event by reducing the effect of impact of the occupant against structures (body-structure impact) within the vehicle.

Some embodiments disclosed herein can provide improved positioning, cushioning, and/or safety to occupants involved in particular types of collisions. For example, some embodiments can be configured to cushion a vehicle driver and/or front-seat passenger seated adjacent the door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test. The conditions for the IIHS small overlap frontal crash test and the NHTSA oblique impact test are disclosed in the Insurance Institute for Highway Safety, Small Overlap Frontal Crashworthiness Evaluation Crash Test Protocol (Version II) (December 2012); and Saunders, J., Craig, M., and Parent, D., Moving Deformable Barrier Test Procedure for Evaluating Small Overlap/Oblique Crashes, SAE Int. J. Commer. Veh. 5(1):172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the vehicle-forward direction. The inflatable airbag of the present disclosure may be used alone or in combination with one or more additional inflatable airbags deployed from other areas within the vehicle.

FIG. 1 is an isometric side view of an inflatable airbag assembly 100 in a deployed state disposed about an occupant 50 in a vehicle seating position 30 of a vehicle. The vehicle seating position may be a position in which an occupant is generally positioned when seated in a seat of a vehicle. The term "occupant" can refer to a person or crash test dummy within or otherwise occupying a vehicle.

A vehicle seat assembly 40 includes a seat 42, a seat back 44, and a head back 45. The inflatable airbag assembly 100 is shown in a substantially fully deployed and inflated state and includes an inflatable cushion 110 extending forward and above the vehicle seating position 30 and along a first lateral side 31 (e.g. left side) and a second lateral side 32 (e.g. right side) of the vehicle seating position 30. In some embodiments, the inflatable cushion 110 may partially encompass the vehicle seating position 30 and an occupant 50 in the vehicle seating position 30. The inflatable cushion 110 may also deploy or extend laterally outward on both sides of the seat back 44, and may also extend laterally outward on both sides of the head back 45 and upward of the head back 45.

The inflatable cushion 110 may include a main chamber 120 and a ring chamber 160 and may be in fluid communication with each other. The main chamber 120 may be defined by a frontal chamber 150, a first lateral chamber 130, and a second lateral chamber 140 all of which are in fluid communication with each other. The frontal chamber 150 joins the first lateral chamber 130 at a first end 151 of the frontal chamber 150, and also joins the second lateral chamber 140 at a second end 152 of the frontal chamber 150.

The ring chamber 160 may be defined by a front portion 161, a rear portion 162, and/or upper portions of the first lateral chamber 130 and the second lateral chamber 140. As such, the ring chamber 160 may have a donut shape, when viewed from above the vehicle seating position 30, having an opening (not shown) above the vehicle seating position 30. In some embodiments, the opening may be disposed above the vehicle seating position 30 and, in some instances, above the head 51 of the occupant 50 seated in the vehicle seating position 30. The front portion 161 of the ring chamber 160 may extend upward and forward of the vehicle seating position 30 so as to be above and forward of the head 51 of the occupant 50 when seated in the vehicle seating position 30. The rear portion 162 may be disposed above the head back 45 of the vehicle seat assembly 40 and may also extend above and/or behind the head 51 of the occupant 50 when seated in the vehicle seating position 30. In some embodiments, the rear portion 162 may also extend forward and/or rearward of the head back 45. In some embodiments, the ring chamber 160 may look like a U shape instead of a donut, formed by the front portion 161 and the upper portions of lateral chambers 130 and 140. Similarly, rear portion 162 may be omitted. In some embodiments, the ring chamber 160 may be partially or fully closed off with another panel or inflated panel, or combination thereof.

The frontal chamber 150 extends forward of the vehicle seating position 30 such that the frontal chamber 150 extends forward of a torso of the occupant 50 when seated in the vehicle seating position 30. The frontal chamber 150 may extend downward so as to be adjacent and/or in contact with the top of the legs of the occupant 50 when seated in the vehicle seating position 30. In some embodiments, the frontal chamber 150 may extend forward of the knees of the occupant 50 in the vehicle seating position 30. The frontal chamber 150 may also extend upward above the torso of the occupant 50, and in some embodiments, the frontal chamber 150 may also extend upward so as to be adjacent the shoulders of the occupant 50. A rear side of the frontal chamber 150 may extend rearward so as to be adjacent and/or in contact with the torso of the occupant 50. A front side of the frontal chamber 150 may also extend to or beyond the knees of the occupant 50.

In some embodiments, front portions of the first lateral chamber 130 and a second lateral chamber 140 may extend forward of the face and shoulders of the occupant 50. Lower portions of the first lateral chamber 130 and the second lateral chamber 140 may extend downward to be adjacent and/or below the hips of the occupant 50 and may extend further to be adjacent and/or below the seat 42.

The main chamber 120 and the ring chamber 160 may define a frontal opening or window 111. The window 111 may be bounded on the sides by the first lateral chamber 130 and the second lateral chamber 140, on the top by the front portion 161 of the ring chamber 160, and the bottom by the frontal chamber 150. In some embodiments, the window 111 may enable the occupant to interact with additional airbag systems, such as a steering wheel airbag or a passenger frontal airbag.

Figure 1A:
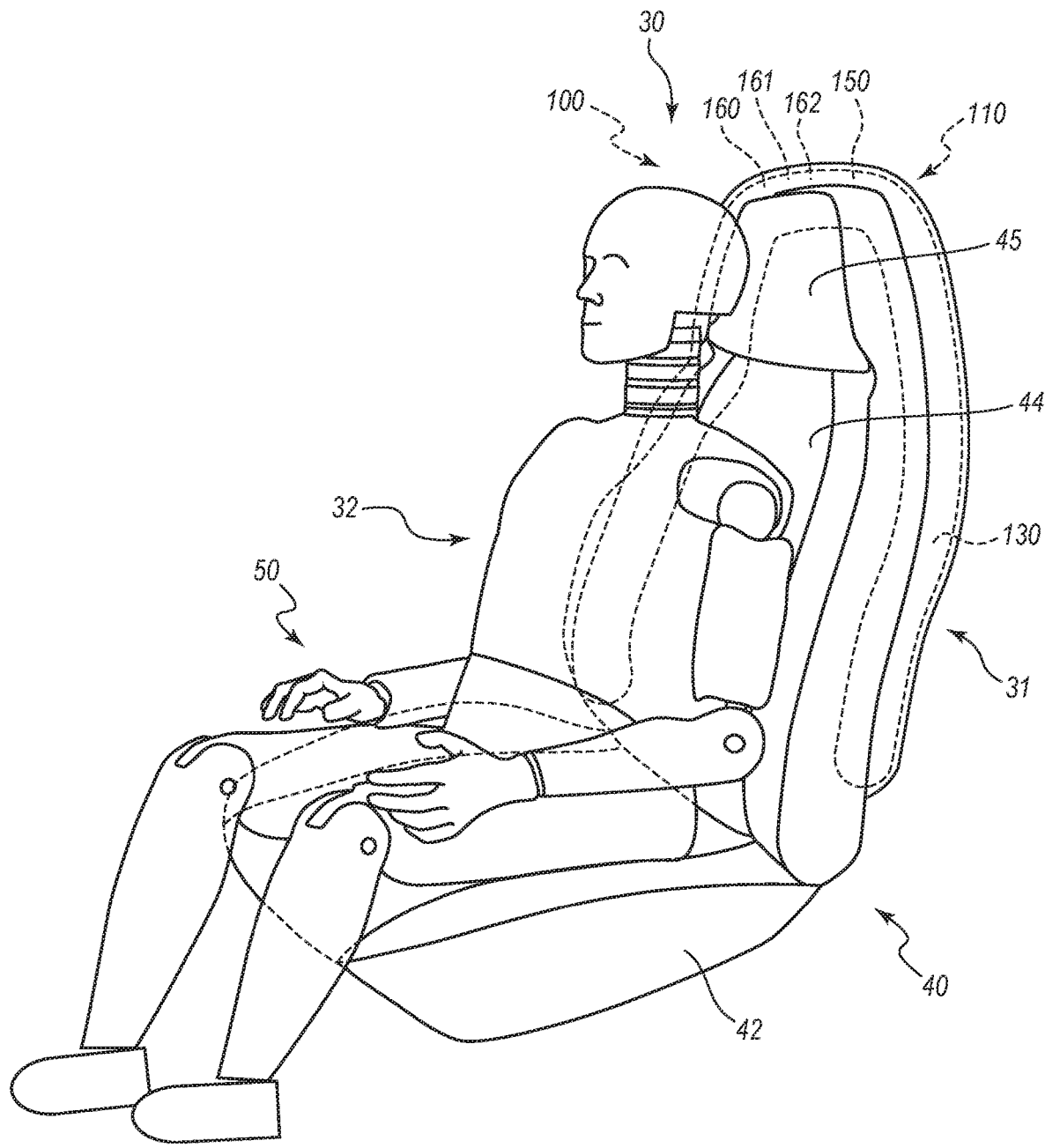
FIG. 1A is an isometric side view of a vehicle seat having an occupant in a seating position thereof and the inflatable airbag assembly of FIG. 1 in an undeployed state disposed within a seat back of the vehicle seat.

FIGS. 1A-1F show the inflatable airbag assembly 100 in sequential states of deployment during inflation. FIG. 1A is an isometric side view of the vehicle seat assembly 40 with the occupant 50 seated in the vehicle seating position 30 and the inflatable airbag assembly 100 in an undeployed and packaged state. In the packaged state, the inflatable airbag assembly 100 could be disposed within the seat back 44 and the head back 45 of the vehicle seat assembly 40 as shown with hidden lines. The inflatable airbag assembly 10 could be also be disposed entirely within the seat back 44 and packaged across the seat back below head back 45. The vehicle seat assembly 40 may include a cavity for disposition of the undeployed inflatable airbag assembly 100 therein. The cavity may be disposed along the side edges of the seat back 44 and side edges of the head back 45 and extend up and over the top of the head back 45 forming a continuous elongate upside down U-shape disposed along a majority of the perimeter of the seat back 44 and the head back 45. In some embodiments, the cavity for disposition may be disposed entirely in the seat back 44. In the undeployed state, the inflatable cushion 110 may be rolled up, folded or otherwise compressed to a minimal volume and a shape consistent with the shape of the cavity. The first lateral chamber 130 and the second lateral chamber 140 may be disposed within the cavity extending along the respective side edges of the seat back 44. The frontal chamber 150 together with the ring chamber 160 may be compressed together and disposed within the portion of the cavity disposed along a perimeter of the head back 45. In some embodiments, portions of the first lateral chamber 130 and the second lateral chamber 140 may be disposed along the head back portions of the cavity, and portions of the frontal chamber 150 and the ring chamber 160 may be disposed in the portions of the cavity extending along the side edges of the seat back 44. In some instances, a top portion of the head back 45 may extend above the top of the head 51 of the occupant 50 such that the cavity is also disposed above the top of the head 51. In other instances, it may be below the top of the head 51. In other embodiments, the frontal chamber 150 together with the ring chamber 160 along with portions of lateral chambers 130 and/or 140 may be disposed in a cavity that runs across seatback 44 and may or may not be primarily below head back 45.

Figure 1B:
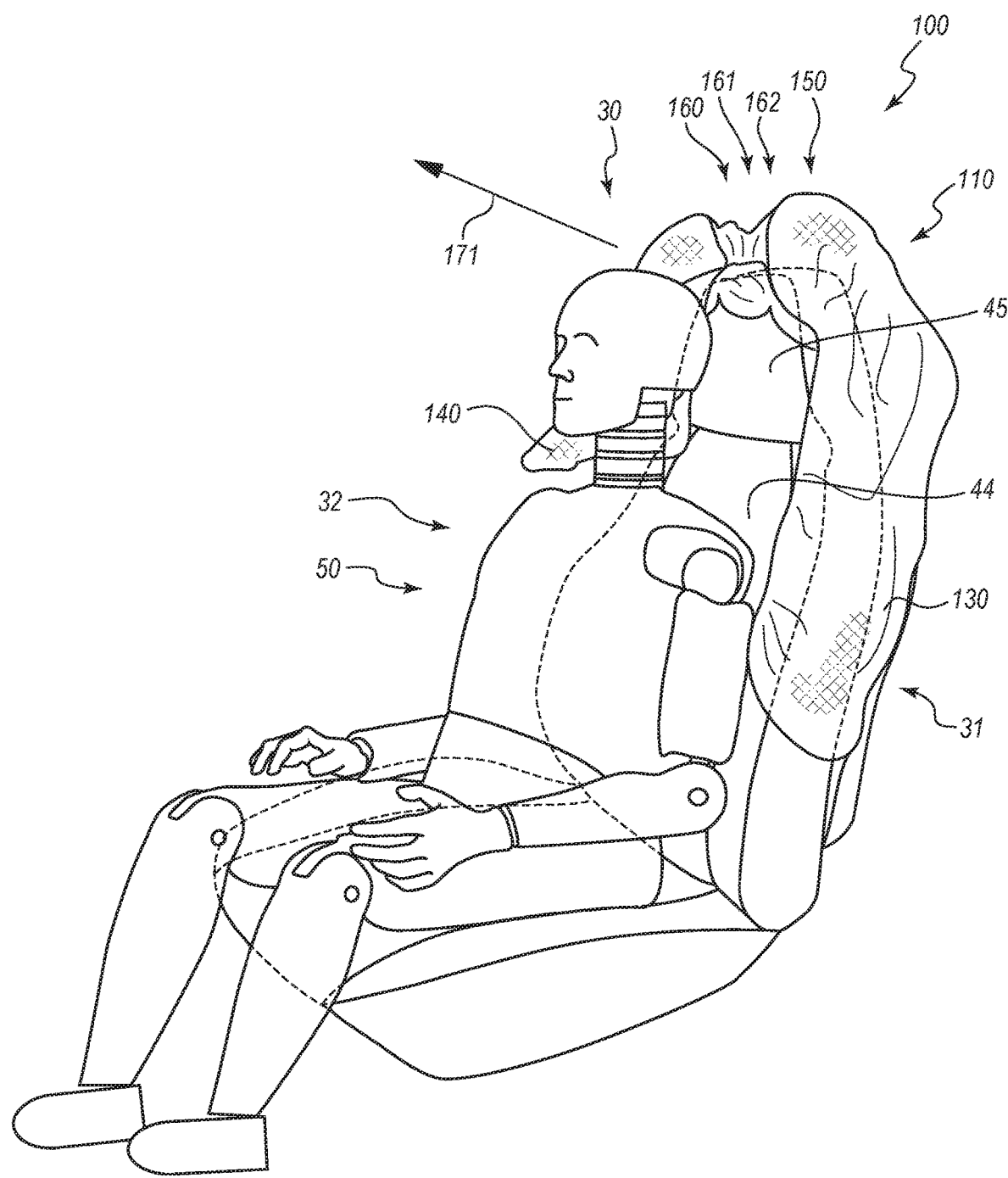
FIG. 1B is an isometric side view of the vehicle seat having the occupant in the seating position thereof and the inflatable airbag assembly of FIG. 1A disposed adjacent the seat back in an initial partially deployed state.

FIGS. 1B-1E illustrate the inflatable airbag assembly 100 in sequential states of partial deployment. In FIG. 1B, the inflatable cushion 110 is in an initial state of inflation. During inflation, portions of the cavity may open so as to allow the inflatable cushion 110 to exit the cavity. As shown in FIG. 1B, the first lateral chamber 130 and the second lateral chamber 140 deploy and extend laterally away from the side edges of the seat back 44, and the frontal chamber 150 together with the ring chamber 160 deploy and extend upward and laterally away from the head back 45 or over head back 45 if packaged behind or below it. As the frontal chamber 150 is configured to deploy from an initial position behind the vehicle seating position 30 to a final position in front of the vehicle seating position 30 with the occupant 50 seated in the vehicle seating position 30, the inflatable airbag assembly 100 may be configured to deploy the frontal chamber 150 along a defined path. The defined path may comprise a first trajectory 171 and a second trajectory 172 (see FIG. 1E). FIG. 1B illustrates the frontal chamber 150 together with the front portion 161 of the ring chamber 160 extending in the first trajectory 171. The first trajectory 171 may be defined as upward and in a forward direction above the vehicle seating position 30 so as to be above the head 51 of the occupant 50 when seated in the vehicle seating position 30. In some embodiments, the frontal chamber 150 and the ring chamber 160 may be coupled together. The coupling of the frontal chamber 150 and the ring chamber 160 enable the frontal chamber 150 and the ring chamber 160 to be deployed at the same first trajectory 171. Various coupling mechanisms are discussed in further detail below.

Figure 1C:
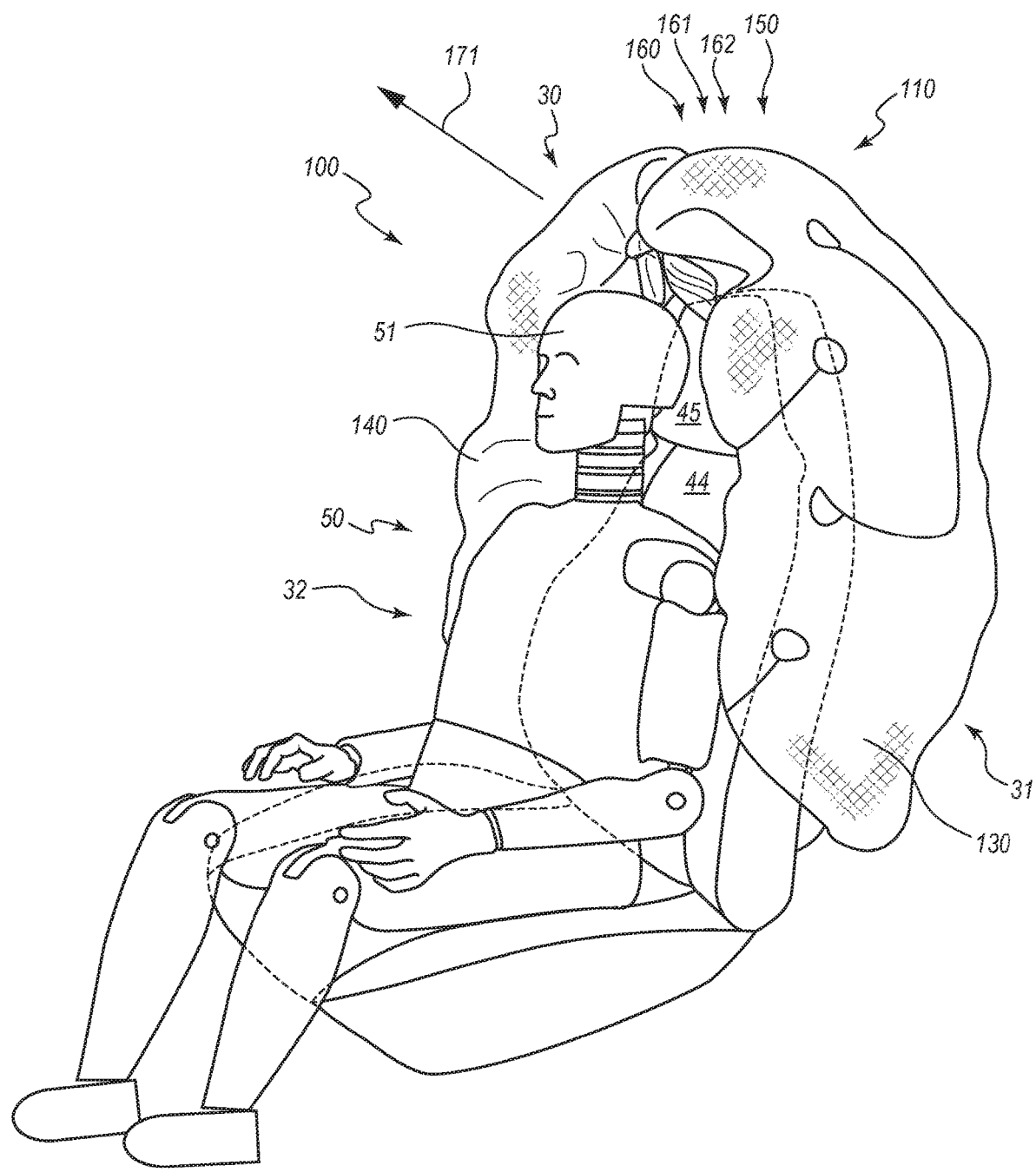
FIG. 1C is an isometric side view of the vehicle seat having the occupant in the seating position thereof and the inflatable airbag assembly of FIG. 1B in a further partially deployed state.

In FIG. 1C, the inflatable cushion 110 is in a further state of inflation relative to the state illustrated in FIG. 1B. In FIG. 1C, the first lateral chamber 130 and the second lateral chamber 140 continue to extend laterally away from the side edges of the seat back 44 and begin to extend forward along the first lateral side 31 and the second lateral side 32 of the vehicle seating position 30. In addition, the first lateral chamber 130 and the second lateral chamber 140 are extending forward of the seat back 44. Similarly, the frontal chamber 150 together with the front portion 161 and the rear portion 162 of the ring chamber 160 continue to extend upward and laterally away from the head back 45. The frontal chamber 150 and the front portion 161 of the ring chamber 160 continue together to extend in the first trajectory 171.

Figure 1D:
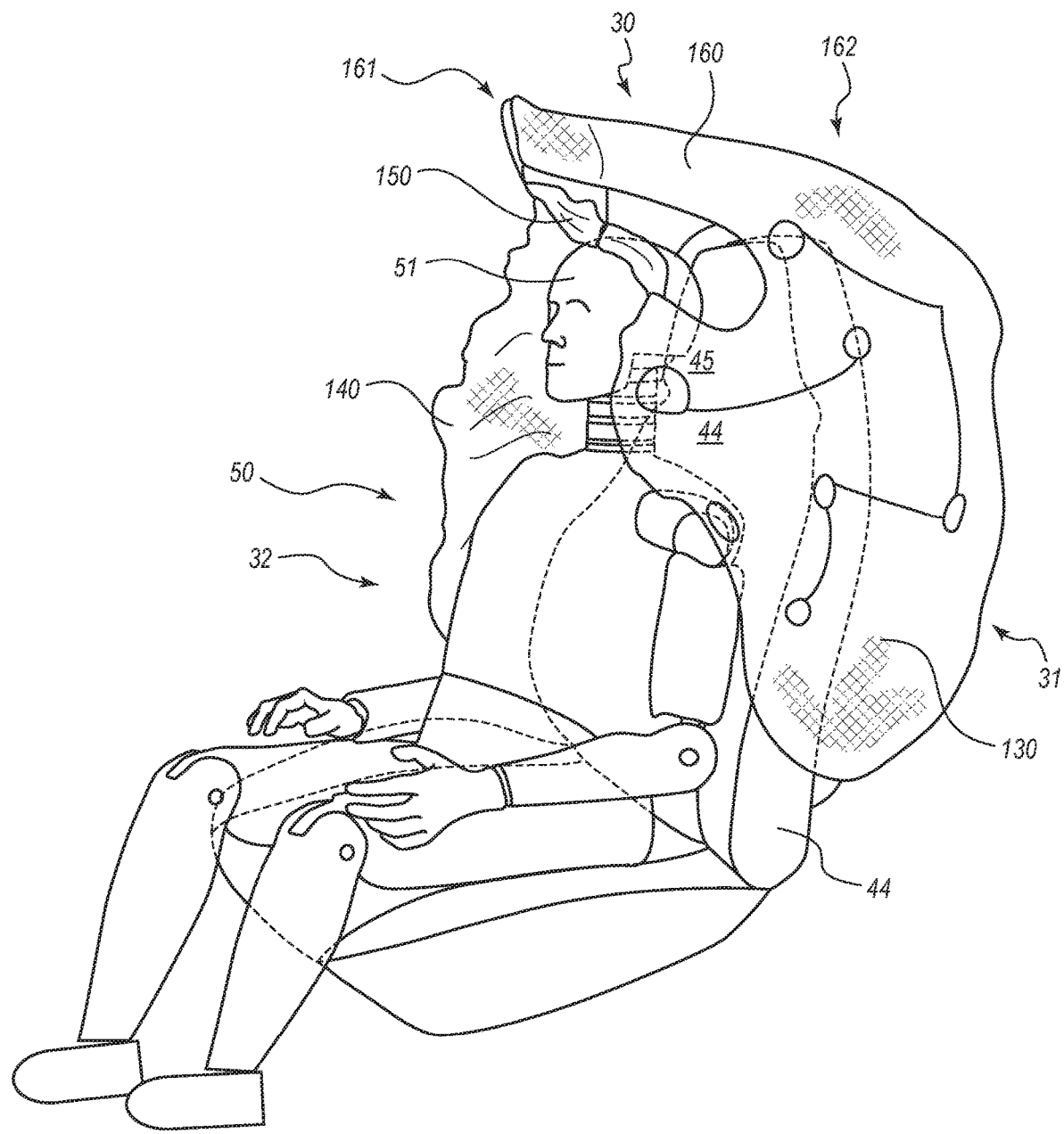
FIG. 1D is an isometric side view of the vehicle seat having the occupant in the seating position thereof and the inflatable airbag assembly of FIG. 1C in still a further partially deployed state.

In FIG. 1D, the inflatable cushion 110 is in a further state of inflation relative to the state illustrated in FIG. 1C. In FIG. 1D, the first lateral chamber 130 and the second lateral chamber 140 continue to inflate and extend forward of the seat back 44. Similarly, the front portion 161 and the rear portion 162 of the ring chamber 160 continue to inflate with the front portion 161 continuing to extend in the forward direction away from the head back 45. The frontal chamber 150 may be configured to inflate more slowly than the ring chamber 160 as further described below. As such, the frontal chamber 150 continues to extend in the forward direction in a state of inflation less than the ring chamber 160. As discussed previously, the frontal chamber 150 may be coupled to the front portion 161 of the ring chamber 160 so that the forward extension of the front portion 161 exerts a forward directed force in the first trajectory 171 on the frontal chamber 150 to facilitate forward extension of the frontal chamber 150 so as to be forward of the vehicle seating position 30. The first lateral chamber 130 continues to extend forward along the first lateral side 31 and the second lateral chamber 140 continues to extend forward along the second lateral side 32.

Figure 1E:
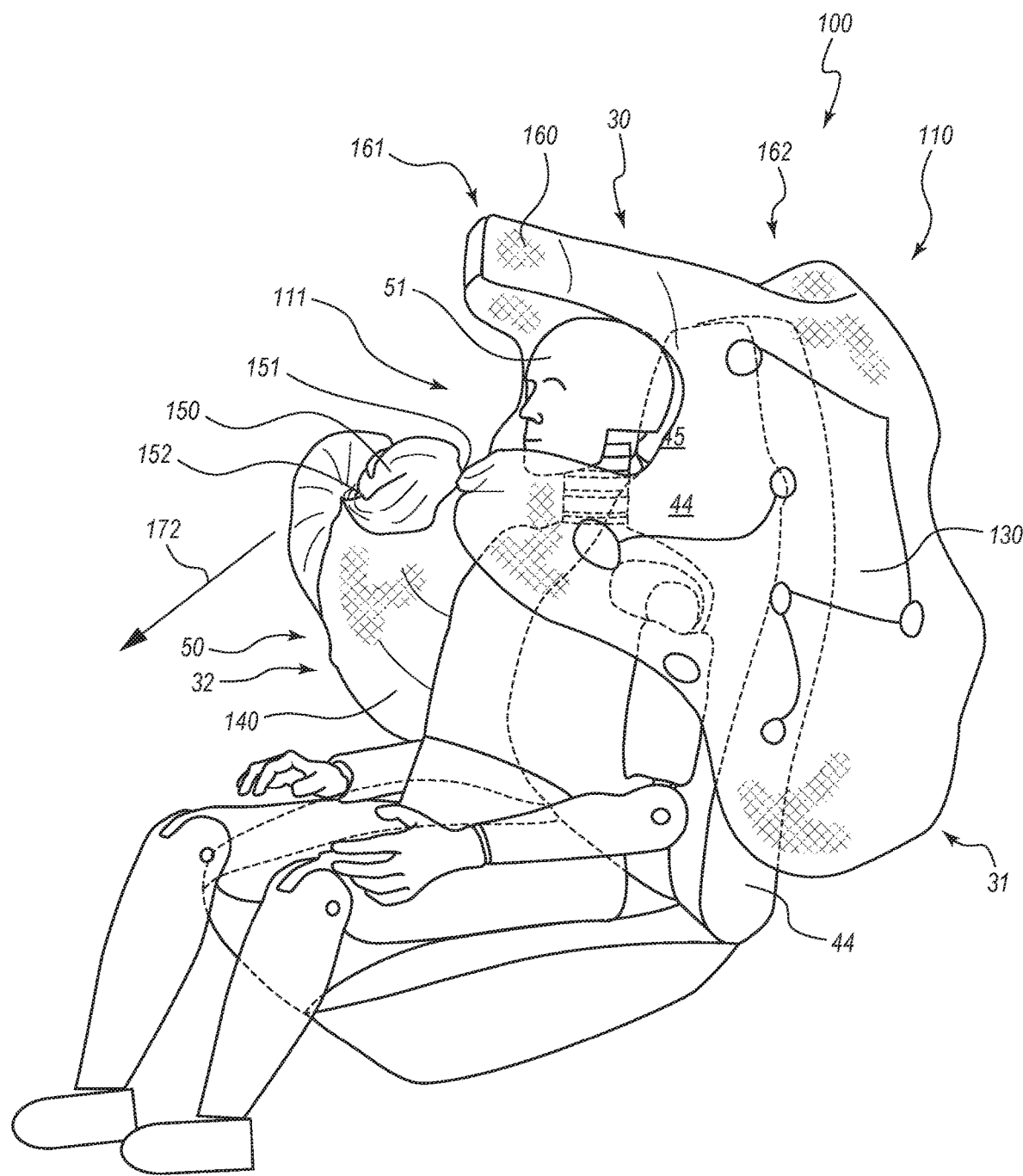
FIG. 1E is an isometric side view of the vehicle seat having the occupant in the seating position thereof and the inflatable airbag assembly of FIG. 1D in still a further partially deployed state.

In FIG. 1E, the inflatable cushion 110 is in a further state of inflation relative to the state illustrated in FIG. 1D. In FIG. 1E, the first lateral chamber 130 and the second lateral chamber 140 are substantially fully inflated and extended along the first lateral side 31 and the second lateral side 32, respectively. The ring chamber 160 is substantially fully inflated with the front portion 161 fully extended in the forward direction. The frontal chamber 150 is only partially inflated and has decoupled from the front portion 161 of the ring chamber 160, thus allowing the frontal chamber 150 to displace in a second trajectory 172. In some embodiments, the second trajectory 172 is defined as a forward and downward direction in front of the vehicle seating position 30 relative to the position shown in FIG. 1D so as to be in front of the occupant 50 when seated in the vehicle seating position 30. The separation of the frontal chamber 150 and the front portion 161 begins the formation of the window 111. The partial inflation of the frontal chamber 150 helps establish a shape and/or density of the frontal chamber 150 to enable momentum of the frontal chamber 150 to aid in the displacement of the frontal chamber 150 along the defined path, e.g. the second trajectory.

In some embodiments, the frontal chamber 150 may be twisted relative to the lateral chambers 130 and 140. For example, in one embodiment, the frontal chamber 150 may be twisted relative to the first lateral chamber 140 at the first end 151 of the frontal chamber 150. In another embodiment, the frontal chamber 150 may be twisted relative to the second lateral chamber 140 at the second end 152 of the frontal chamber 140. In some embodiments, the frontal chamber 150 may be twisted relative to the first lateral chamber 130 at the first end 151 of the frontal chamber 150 and may be twisted relative to the second lateral chamber 140 at the second end 152 of the frontal chamber 150. The twisting of the frontal chamber 150 relative to the first lateral chamber 130 and the second lateral chamber 140 may inhibit or slow down inflation of the frontal chamber 150 relative to the inflation rate of the first lateral chamber 130, the second lateral chamber 140, and the ring chamber 160 as the inflation gas cannot inflate the frontal chamber 150 until the frontal chamber 150 untwists from or relative to the first lateral chamber 130 and the second lateral chamber 140. In other embodiments, the frontal chamber 150 may not be twisted relative to either lateral chamber 130 or 140. In other embodiments, the inflation of the frontal chamber 150 relative to the side chambers 130 or 140 may not be delayed or significantly delayed.

In some embodiments, the first end 151 of the frontal chamber 150 may be z-folded, scrunched, or otherwise compressed relative to the first lateral chamber 130 and the second end 152 of the frontal chamber 150 opposite the first end 151 of the frontal chamber is z-folded, scrunched, or otherwise compressed relative to the second lateral chamber 140. During deployment, the first end 151 of the frontal chamber may unfold relative to the first lateral chamber 130 and the second end 152 may unfold relative to the second lateral chamber 140. The z-folding of the frontal chamber 150 relative to the first lateral chamber 130 and the second lateral chamber 140 may inhibit or slow down inflation of the frontal chamber 150 relative to the inflation rate of the first lateral chamber 130, the second lateral chamber 140, and the ring chamber 160 as the inflation gas cannot inflate the frontal chamber 150 until the frontal chamber 150 unfolds from or relative to the first lateral chamber 130 and the second lateral chamber 140.

Figure 1F:
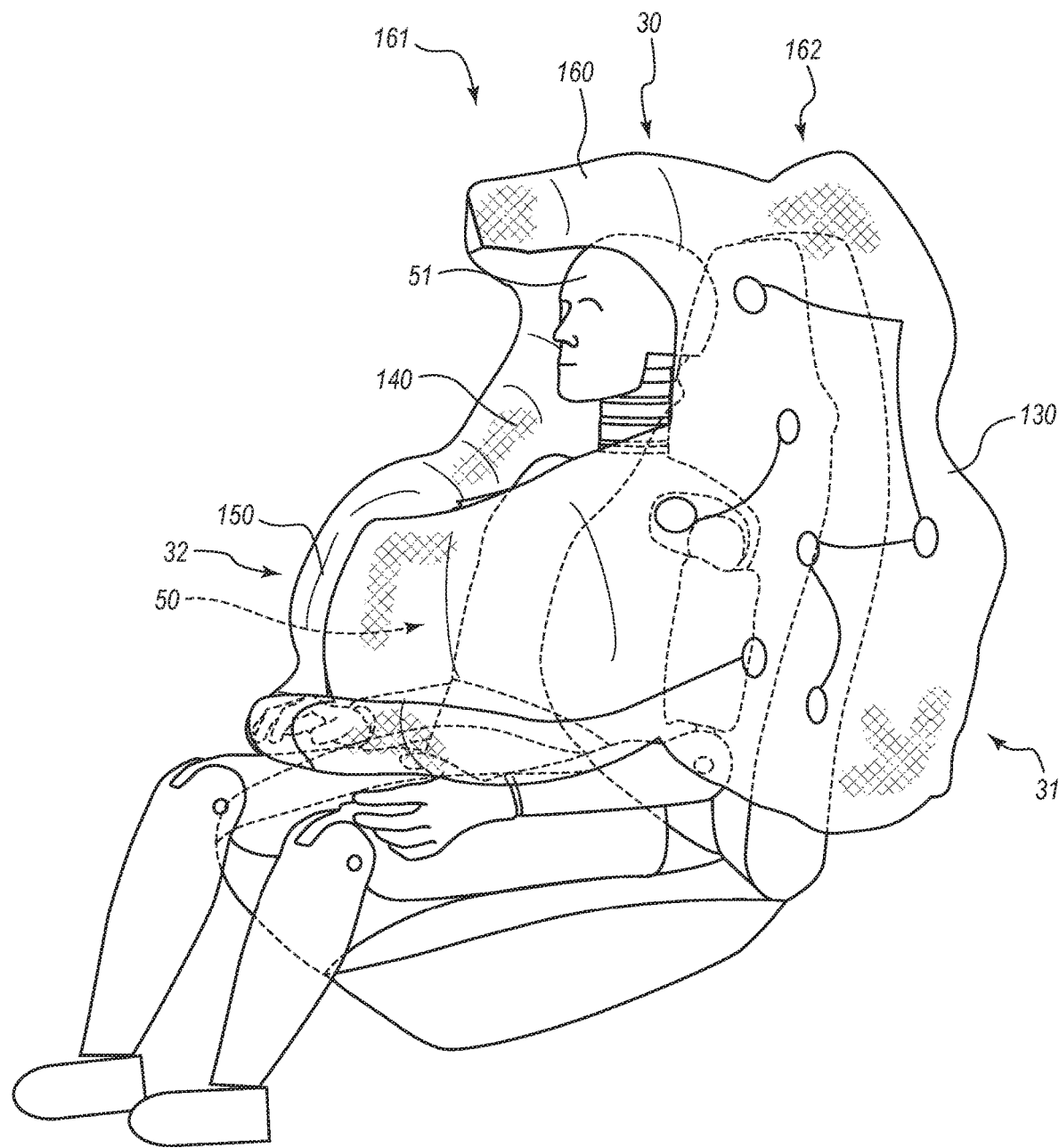
FIG. 1F is an isometric side view of the vehicle seat having the occupant in the seating position thereof and the inflatable airbag assembly of FIG. 1E in a fully deployed state.

In FIG. 1F, the inflatable cushion 110 is in a fully deployed state. The first lateral chamber 130 and the second lateral chamber 140 are fully inflated and extended along the first lateral side 31 and the second lateral side 32, respectively, and the front portion 161 of the ring chamber 160 is fully inflated and fully extended in the forward direction. The front portion 161 and rear portion 162 of the ring chamber 160 are fully inflated establishing the donut-shaped opening (not shown) above the vehicle seating position 30. In some embodiments, the ring chamber 160 may establish a U shaped opening (not shown) above the vehicle seating position 30. In other embodiments, this ring may be partially or totally closed off with a panel or inflatable panel or combination thereof. The ring chamber may be made of a singularity or plurality of chambers. It may be filled mostly from the rear or from multiple points of entry from the side chambers 130 and/or 140. The frontal chamber 150 is fully inflated and positioned in front of the vehicle seating position 30 and the window 111 is formed.

Figure 2:
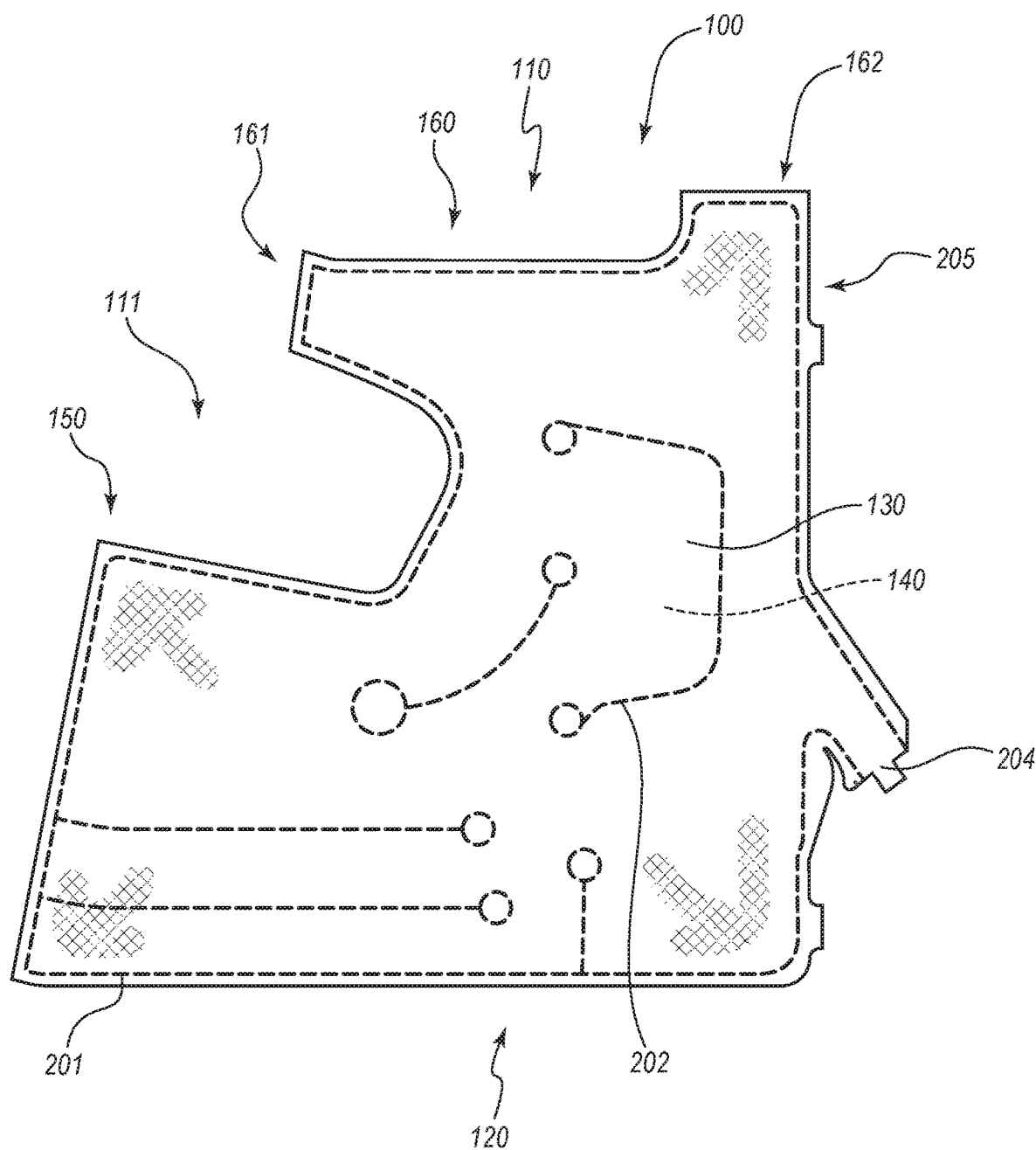
FIG. 2 is a side view of the inflatable airbag assembly of FIG. 1 in a uninflated state prior to being packaged for disposition within the seat back.

FIG. 2 is a side view of the inflatable airbag assembly 100 in an uninflated state. The inflatable airbag assembly 100 includes an inflator 204 and, as stated above, an inflatable cushion 110. The inflatable cushion 110 may be formed of a singularity or plurality of fabric panels 205 coupled together via outer seams 201 so as to define the main chamber 120 and the ring chamber 160. The outer seams 201 may also couple the fabric panels 205 together to define the first lateral chamber 130, the second lateral chamber 140, and the frontal chamber 150. The outer seams 201 may further couple the fabric panels 205 together to define the front portion 161 and rear portion 162 of the ring chamber 160 and the window 111. In some embodiments, the rear portion 162 may not be formed by the outer seams 201. In some embodiments, inner seams 202 may couple portions of the fabric panels 205 together to further define or constrain the inflated shape of the chambers. In the illustrated embodiment, the inflator 204 may be coupled to the inflatable cushion 110 along a rear region of one of the first lateral chamber 130 and the second lateral chamber 140. In other embodiments, the inflator 204 may be coupled to the inflatable cushion 110 at another location.

As stated above, the frontal chamber 150 may be coupled to the ring chamber 160 and more specifically the front portion 161 of the ring chamber 160. FIGS. 3A-3D illustrate exemplary coupling mechanisms and methods. The coupling between the ring chamber 160 and the frontal chamber 150 may be temporary. As such, the frontal chamber 150 may be coupled to the ring chamber 160 before deployment and during an early portion of deployment. During a later portion of deployment and after deployment, the frontal chamber 150 may be decoupled from the ring chamber 160. The coupling mechanism may decouple based upon conditions of the inflatable cushion 110 during deployment. For example, the coupling mechanism may decouple when one or more chambers exceed a defined state of inflation. In some embodiments, the coupling mechanism may decouple due to an elevated level of tensile stress imposed on the coupling mechanism as the one or more chambers expand or otherwise change shape. In other embodiments, the elevated level of tensile stress may be imposed on the coupling mechanism as the one or more chambers displace relative each other. In the illustrated embedment, the coupling mechanism may couple a portion of the frontal chamber 150 to a portion of the ring chamber 160, which may be disposed in close proximity to each other when inflatable cushion 110 is uninflated but disposed away from each other when the inflatable cushion 110 is inflated. As such, separation of the coupled portions may cause decoupling of the coupling mechanism.

Figure 3A:
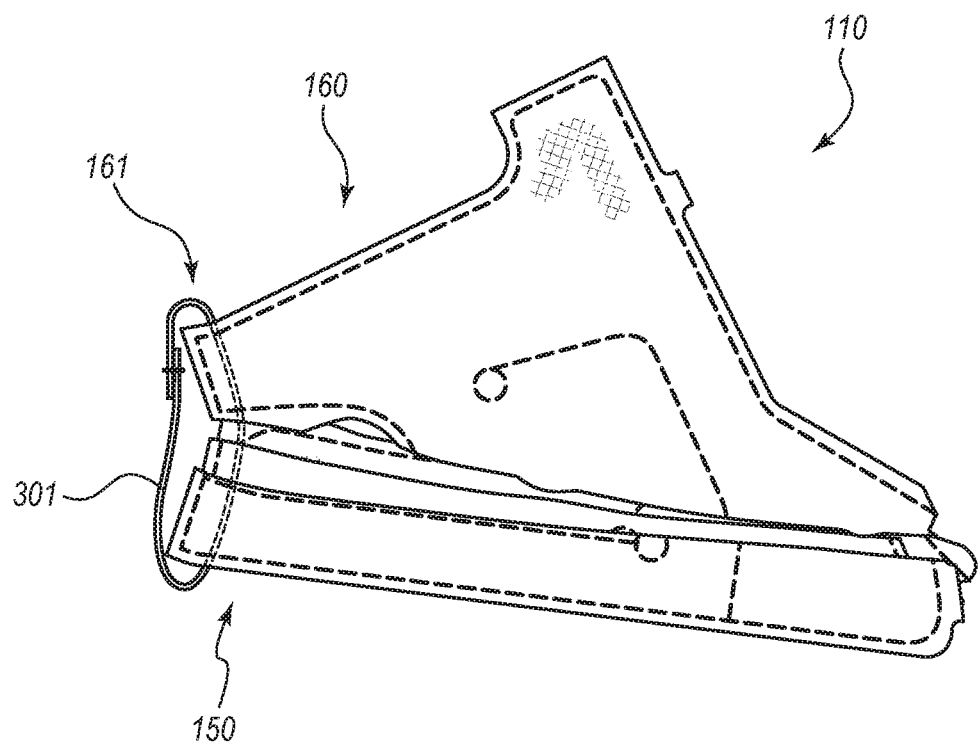
FIG. 3A is a side view of an inflatable airbag assembly in a partially folded state illustrating one embodiment of a coupling mechanism in the form of a band around a ring chamber and a frontal chamber of the inflatable airbag assembly.

FIG. 3A depicts an embodiment of a coupling mechanism in the form of a band 301 disposed around the front portion 161 of the ring chamber 160 and the frontal chamber 150 so as to constrain the frontal chamber 150 in close proximity to the front portion 161. The band 301 may be formed of any structure so as to define a closed loop. For example, the band 301 may be formed from a flat strap, a round cord, a solid filament, a tape, or any other suitable material. The band 301 could be closed by a variety of measures, such as adhesive, sewing, hook/loop, friction or other methods. The band 301 may not be actually physically closed, but just wrapped around front portion 161 and the frontal chamber 150. As such, the frontal chamber 150 and the front portion 161 may deploy along the same path or trajectory during a portion of deployment as illustrated in FIGS. 1B-1D. At a point during deployment, a level of tension force may exceed a breaking strength of the band 301 whereupon the band 301 breaks and allows the frontal chamber 150 to displace away from the front portion 161. In some embodiments, the band 301 may not break, but just unwrap. In some embodiments, the band 301 may be formed of a material having a breaking strength strong enough to maintain coupling of the frontal chamber 150 to the ring chamber 160 during displacement of the frontal chamber 150 and weak enough to break upon continued inflation of the ring chamber 160 due to a hoop stress applied by an inflation pressure within the ring chamber 160, for example. In other embodiments, the band 301 may include a weakened segment to define the breaking strength such as a thinner section, notched section, perforated section, scored section or point where ends of the band 310 are coupled together. For example, the ends of the band 310 may be coupled together via stitching or adhesive, such that the ends of the band 301 separate to break the band 301. As such, the frontal chamber 150 may displace downward and in front of the vehicle seating position 30 while the ring chamber 160 may remain at a level adjacent or above the head back 45 of the vehicle seat assembly 40.

Figure 3B:
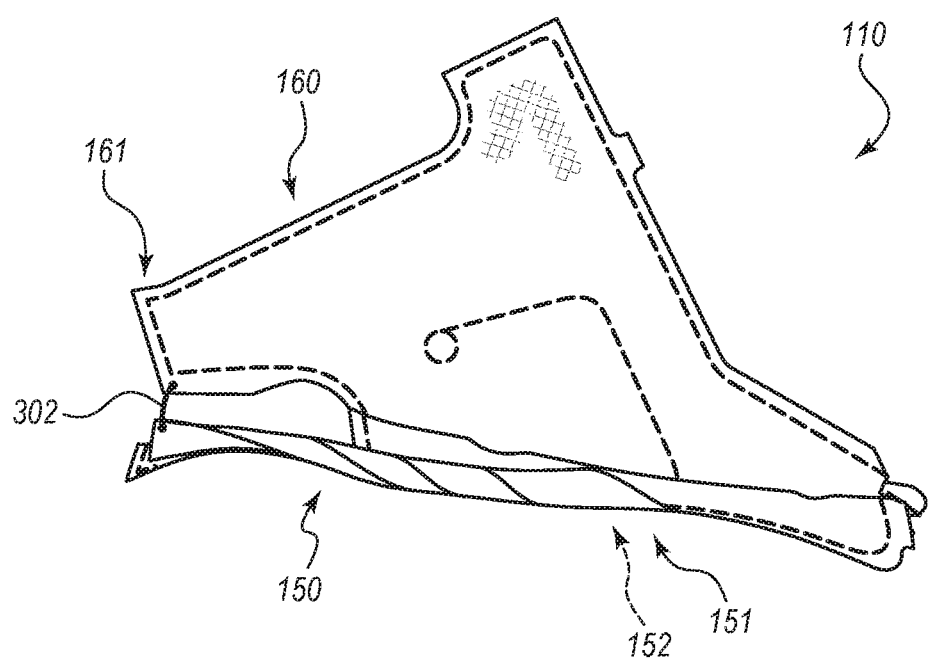
FIG. 3B is a side view of an inflatable airbag assembly in a partially folded state illustrating another embodiment of a coupling mechanism in the form of a tag between a ring chamber and a frontal chamber of the inflatable airbag assembly.

FIG. 3B depicts another embodiment of a coupling mechanism in the form of a tag 302 disposed between the front portion 161 of the ring chamber 160 and the frontal chamber 150 so as to constrain the frontal chamber 150 in close proximity to the front portion 161. As with the band 301, the tag 302 may constrain the frontal chamber 150 and the front portion 161 to deploy along the same path or trajectory during a portion of deployment. At a point during deployment, a level of tension may exceed the coupling capability of the tag 302 whereupon the coupling capability of the tag 302 is defeated, which allows the frontal chamber 150 to displace away from the front portion 161. In the illustrated embodiment, the tag 302 as pierced through the cushion selvage, but the tag 302 could be pierced through inflated chambers or inflated on one side and uninflated on the other. In other embodiments, there may be more than one tag 302.

FIG. 3B also illustrates a twisted configuration of the frontal chamber 150 in the undeployed state. A center portion of the frontal chamber 150 may be twisted relative to the first end 151 and the second end 152 of the frontal chamber 150 establishing a twisted configuration of the first end 151 and the second end 152 of the frontal chamber 150. As shown, the center portion of the frontal chamber 150 may be coupled to the front portion 161 of the ring chamber 160 when the frontal chamber 150 is in the twisted state. The tag 302 may inhibit untwisting of the first end 151 and the second end 152 until the frontal chamber 150 is decoupled from the ring chamber 160. The twisted configuration of the first end 151 and the second end 152 of the frontal chamber 150 may inhibit or slow down inflation of the frontal chamber 150 relative to the inflation rate of the first lateral chamber 130, the second lateral chamber 140, and the ring chamber 160. The twisted configuration of the frontal chamber 150 may provide for displacement of the frontal chamber 150 along the defined path comprising the first trajectory 171 as illustrated in FIGS. 1B and 1C and the second trajectory 172 as illustrated in FIG. 1E. In the illustrated embodiment, the twisted configuration may establish a shape and/or density of the frontal chamber 150 to enable momentum of the frontal chamber 150 to aid in the displacement of the frontal chamber 150 along the defined path. In other embodiments, methods other than twisting may establish the desired shape or density of the frontal chamber 150, such as a sleeve disposed around the frontal chamber 150, seams or adhesive coupling portions of the frontal chamber 150 together, etc. In the illustrated embodiment, the deployment direction of the front portion 161 of the ring chamber 160 may be defined, directed, or influenced by the expansion of the ring chamber 160 during inflation. As the frontal chamber 150 is coupled to the front portion 161, the frontal chamber 150 may be constrained to displace along the same or similar path as the front portion 161 establishing a momentum of the twisted frontal chamber 150 along the first trajectory 171 (see FIGS. 1B and 1C). Upon decoupling of the frontal chamber 150 from the ring chamber 160, the momentum of the twisted frontal chamber 150 may cause the frontal chamber 150 to continue to displace along the first trajectory 171 independent of the front portion 161. As such, the momentum of the twisted frontal chamber 150 may enable the frontal chamber 150 to displace upward and forward of the vehicle seating position 30.

Figure 3C:
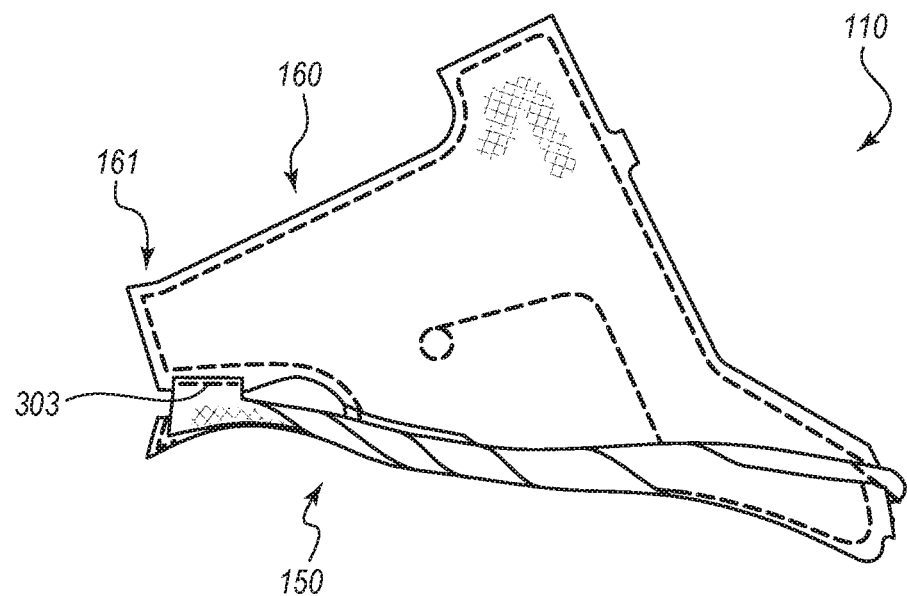
FIG. 3C is a side view of an inflatable airbag assembly in a partially folded state illustrating another embodiment of a coupling mechanism in the form of a break stitch between a ring chamber and a frontal chamber of the inflatable airbag assembly.

FIG. 3C depicts another embodiment of a coupling mechanism in the form of a break stitch 303 disposed between the front portion 161 of the ring chamber 160 and the frontal chamber 150 so as to constrain the frontal chamber 150 in close proximity to the front portion 161. The break stitch 303 may be sewn between only uninflated regions of these chambers, between only inflated regions of these chambers, or some other combination thereof. A separate panel of various types of fabric could be used to bridge any gaps between where these sews occur. As with the embodiment of FIG. 3B, the frontal chamber 150 may be twisted prior to coupling to the ring chamber 160. In other embodiments, it may not be twisted, but would be otherwise folded or compressed at this stage of overall module folding. The break stitch 303 may prevent untwisting of the frontal chamber 150 and constrain the frontal chamber 150 and the front portion 161 to deploy along the same or similar path or trajectory during a portion of deployment. At a point during deployment, a level of tensile stress may exceed a coupling capability of the break stitch 303 whereupon the frontal chamber 150 is decoupled from the ring chamber 160 and allowed to displace away from the front portion 161.

Figure 3D:
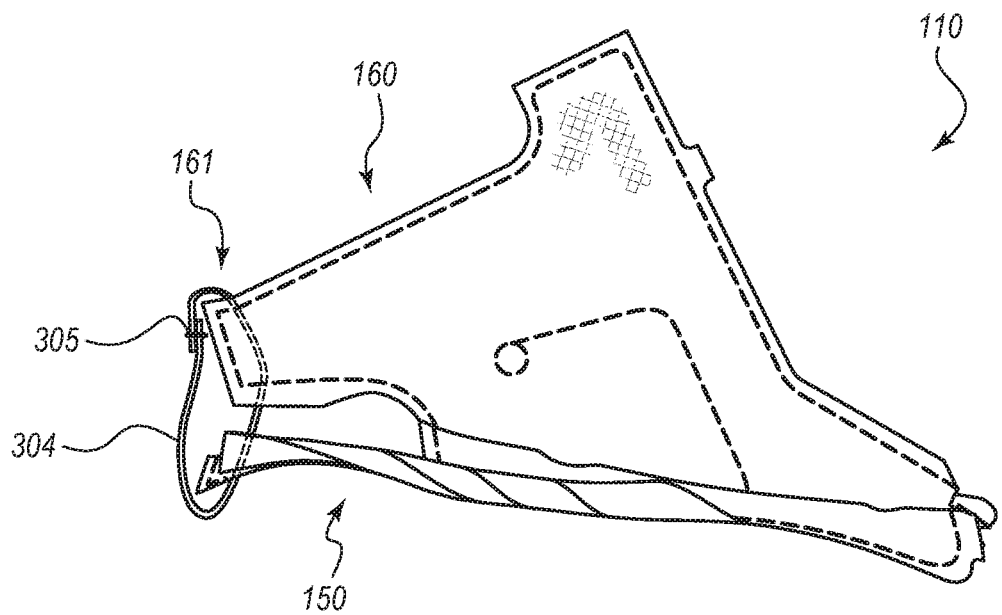
FIG. 3D is a side view of an inflatable airbag assembly in a partially folded state illustrating another embodiment of a coupling mechanism in the form of a wrapper around a portion a ring chamber and a frontal chamber of the inflatable airbag assembly.

FIG. 3D depicts still another embodiment of a coupling mechanism in the form of a wrapper 304 disposed around the front portion 161 of the ring chamber 160 and the frontal chamber 150 so as to constrain a lateral length portion the frontal chamber 150 in close proximity to the front portion 161. In some embodiments, the wrapper 304 may extend between the twisted first end 151 and the twisted second end 152 such that a portion of the frontal chamber 150 between the twisted first end 151 and the twisted second end 152 is coupled to the ring chamber 160. In other embodiments, the wrapper 304 may also couple portions of the twisted first end 151 and the twisted second end 152 to the ring chamber 160. As with the earlier described embodiments, the wrapper 304 may constrain the frontal chamber 150 and the front portion 161 to deploy along the same path or trajectory during a portion of deployment. In similar fashion to the band 301, the wrapper 304 may be formed of a material having a breaking strength strong enough to maintain coupling of the frontal chamber 150 to the ring chamber 160 during displacement of the frontal chamber 150 and weak enough to break upon continued inflation of the ring chamber 160 due to a hoop stress applied by an inflation pressure within the ring chamber 160, for example. In some embodiments, the wrapper 304 may include a tear seam 305 or perforated portion such that, at a point during deployment, the tear seam 305 may separate and allow the frontal chamber 150 to displace away from the front portion 161.

Other methods of temporarily coupling the frontal chamber 150 to the front portion 161 of the ring chamber 160 may be contemplated by one of ordinary skill having the benefit of this disclosure and as are included herein. In some embodiments, the frontal chamber 150 may be coupled to the ring chamber 160 by wrapping a portion of the frontal chamber 150 together with the front portion 161 of the ring chamber 160.

In some embodiments, the inflatable cushion 110 may be packaged into a packaged state for mounting in a vehicle. Packaging the inflatable cushion 110 may include twisting the frontal chamber 150 of the inflatable cushion 100 relative to the first lateral chamber 130 and the second lateral chamber 140 of the inflatable cushion 110. As discussed previously, the frontal chamber may be disposed between the first lateral chamber and the second lateral chamber.

After the frontal chamber 150 is twisted relative to the first lateral chamber 130 and the second lateral chamber 140, the frontal chamber 150 may be coupled to the ring chamber 160 of the inflatable airbag cushion 110 according to any of the embodiments discussed above or by any other coupling mechanism. The ring chamber 160 may be disposed between the first lateral chamber 130 and the second lateral chamber 140 and above the frontal chamber 150.

After the frontal chamber 150 is coupled to the ring chamber 160, the inflatable cushion 110 may be rolled into a collapsed configuration and placed within the cavity which may include a majority of the perimeter of the seat back 44 and the head back 45. In some embodiments the inflatable cushioned is only placed into the seat back 44. As such, a method of packaging of the inflatable airbag cushion 110 into a packaged state for mounting in a vehicle may include the following steps. The frontal chamber 150 may be twisted relative to the first later chamber 130 and the second lateral chamber 140 with the frontal chamber 150 disposed between and the first later chamber 130 and the second lateral chamber 140. The frontal chamber 150 may be coupled to the ring chamber 160 with the ring chamber 160 disposed between the first later chamber 130 and the second lateral chamber 140 and above the frontal chamber 150. The inflatable airbag cushion 110 may then be rolled and/or folded into a collapsed configuration.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. An airbag assembly comprising:
   an inflator; and
   an inflatable cushion deployable to at least partially encompass a vehicle seating position, the inflatable cushion comprising:
   a first lateral chamber to deploy at a first lateral side of the vehicle seating position;
   a second lateral chamber to deploy at a second lateral side of the vehicle seating position;
   a frontal chamber to be disposed between the first lateral chamber and the second lateral chamber and forward of the vehicle seating position in a deployed configuration; and
   a ring chamber to be disposed between the first lateral chamber and the second lateral chamber and above the frontal chamber in the deployed configuration,
   wherein prior to deployment, the ring chamber is coupled to the frontal chamber, and
   wherein the ring chamber decouples from the frontal chamber during deployment.

2. The airbag assembly of claim 1, wherein the ring chamber is coupled to the frontal chamber via a break stitch.

3. The airbag assembly of claim 1, wherein the ring chamber is coupled to the frontal chamber via a wrapper or tape.

4. The airbag assembly of claim 3, wherein the wrapper comprises a tear seam.

5. The airbag assembly of claim 1, wherein prior to deployment, the frontal chamber is wrapped around the ring chamber.

6. The airbag assembly of claim 1, wherein a first end of the frontal chamber is twisted relative to the first lateral chamber.

7. The airbag assembly of claim 6, wherein a second end of the frontal chamber opposite the first end of the frontal chamber is twisted relative to the second lateral chamber.

8. The airbag assembly of claim 1, wherein in the deployed configuration the inflatable cushion defines a window between the frontal chamber and the ring chamber.

9. The airbag assembly of claim 1, wherein inflation of the ring chamber deploys the frontal chamber at an upward and forward trajectory.

10. The airbag assembly of claim 1, wherein the frontal chamber, the first lateral chamber, the second lateral chamber, and the ring chamber are in fluid communication.

11. The airbag assembly of claim 1, wherein the inflatable cushion is deployable from one or more of a seat back and a head back defining the vehicle seating position.

12. The airbag assembly of claim 1, wherein the inflatable cushion is deployable from a majority of a perimeter of a seat back and/or a head back of the vehicle seating position.

13. An airbag assembly comprising:
    an inflatable cushion deployable at a vehicle seating position, the inflatable cushion comprising an undeployed configuration and a deployed configuration, the inflatable cushion comprising:
    a main chamber configured to, in the deployed configuration, encompass an occupant on a left side, a right side, and a front side; and
    a ring chamber to be disposed above the main chamber in the deployed configuration,
    wherein inflation of the ring chamber deploys the main chamber at a first trajectory and the trajectory of the main chamber changes to a second trajectory during deployment.

14. The airbag assembly of claim 13, wherein the first trajectory is upward and forward and the second trajectory is downward and forward.

15. The airbag assembly of claim 13, wherein the main chamber is coupled to the ring chamber and the main chamber decouples from the ring chamber during the second trajectory.

16. A method of deploying an airbag assembly, comprising:
    inflating an inflatable cushion in response to a vehicle collision event, the inflatable cushion comprising:
    a first lateral chamber disposed at a first lateral side of a vehicle seating position in a deployed configuration;
    a second lateral chamber disposed at a second lateral side of the vehicle seating position in the deployed configuration;
    a frontal chamber disposed between the first lateral chamber and the second lateral chamber and forward of the vehicle seating position in the deployed configuration; and a ring chamber disposed between the first lateral chamber and the second lateral chamber and above the frontal chamber in the deployed configuration; and deploying the frontal chamber at an upward and forward trajectory over a head of an occupant of the vehicle seating position.

17. The method of claim 16, wherein a first end of the frontal chamber is twisted relative to the first lateral chamber and a second end of the frontal chamber opposite the first end of the frontal chamber is twisted relative to the second lateral chamber, and wherein the method further comprises untwisting the first end relative to the first lateral chamber and untwisting the second end relative to the second lateral chamber.

18. The method of claim 16, wherein a first end of the frontal chamber is z-folded relative to the first lateral chamber and a second end of the frontal chamber opposite the first end of the frontal chamber is z-folded relative to the second lateral chamber.

* * * * *